(12) United States Patent
Garlick

(10) Patent No.: US 9,038,149 B2
(45) Date of Patent: May 19, 2015

(54) CLOUD BASED PASSWORD MANAGEMENT

(71) Applicant: Rodney O Garlick, West Point, UT (US)

(72) Inventor: Rodney O Garlick, West Point, UT (US)

(73) Assignee: VIRTUAL KEYRING, LLC, West Point, UT (US)

( * ) Notice: Subject to any disclaimer, the term of this patent is extended or adjusted under 35 U.S.C. 154(b) by 0 days.

(21) Appl. No.: 13/718,931

(22) Filed: Dec. 18, 2012

(65) Prior Publication Data

US 2014/0173708 A1  Jun. 19, 2014

(51) Int. Cl.
| | |
|---|---|
| G06F 7/04 | (2006.01) |
| G06F 15/16 | (2006.01) |
| G06F 17/30 | (2006.01) |
| H04L 29/06 | (2006.01) |
| G06F 21/31 | (2013.01) |

(52) U.S. Cl.
CPC ............ *H04L 63/08* (2013.01); *G06F 21/31* (2013.01); *H04L 63/0853* (2013.01); *H04L 63/083* (2013.01); *H04L 63/0815* (2013.01)

(58) Field of Classification Search
CPC .............. H04L 63/0815; H04L 63/083; H04L 63/0853; H04L 63/08; G06F 21/31
USPC .................................................. 726/5, 6, 7
See application file for complete search history.

(56) References Cited

U.S. PATENT DOCUMENTS

| | | |
|---|---|---|
| 2009/0265243 A1 | 10/2009 | Karassner et al. |
| 2011/0154459 A1* | 6/2011 | Kuang et al. ............... 726/6 |
| 2011/0307330 A1 | 12/2011 | Hsiao et al. |
| 2012/0159591 A1* | 6/2012 | Payne et al. ............... 726/7 |
| 2012/0159612 A1* | 6/2012 | Reisgies ............... 726/18 |
| 2013/0185162 A1 | 7/2013 | Mo |

OTHER PUBLICATIONS

Gmail Blog Advanced sign-in security for your Google account Feb. 10, 2011.*
Stack Overflow How to logout previous session of a user,if he logins again on same or different browser Sep. 2009.*
Last Pass manual as available on Feb. 2, 2012 https://web.archive.org/web/20120202125113/http://helpdesk.lastpass.com/full.pdf.*
Norton Identity Safe: Secure Online Password Vault for Android & iOS A. Rehman Feb. 1, 2012.*
Google postini services Message Filtering Troubleshooting Guide Copyright 2008.*

* cited by examiner

*Primary Examiner* — Kambiz Zand
*Assistant Examiner* — Benjamin Kaplan
(74) *Attorney, Agent, or Firm* — David B. Tingey; Kirton McConkie

(57) ABSTRACT

The present invention extends to methods, systems, and computer program products for providing a cloud based password manager that automatically logs in users from any computer. The cloud based password manager does not require that the user install a local plug-in or other tool to perform automatic login. In this sense, unlike current password managers, the password manager of the present invention is completely cloud based. By simply using any browser or a dedicated app on any computer, the user can request a website and receive a copy of the website with the user logged in even if the user has never used the computer.

20 Claims, 14 Drawing Sheets

800

900

901

CLOUD BASED PASSWORD MANAGEMENT

BACKGROUND

1. Field of the Invention

The present invention extends to methods, systems, and computer program products for providing a cloud based password manager that automatically logs in users from any computer.

2. Background and Related Art

With the increasing amount of online interaction available today, a typical individual must maintain login credentials for a large number of websites. It is generally recommended that an individual maintain strong credentials especially to websites that provide access to sensitive data. However, it is difficult to remember each set of login credentials for every site with which the individual has an account.

To address this difficulty, many individuals use password managers. A password manager is a tool that stores a user's login credentials for various websites, and can generally be used to automatically populate the login fields of a website with the appropriate set of credentials.

Many current password managers use some type of plug-in or other module installed locally on the user's computer to perform these functions. These password managers often maintain a cloud based repository for storing a master copy of a user's credentials. However, to use such password managers to automatically populate the login fields of a website being accessed on a local computer, the plug-in must be installed on the local computer.

For example, LastPass, a currently popular password manager, employs a browser plug-in. The browser plug-in detects when a user has navigated to a website for which LastPass stores the user's credentials, and can automatically populate the website's login fields with the user's credentials. After auto-populating the login credentials, LastPass can also cause the credentials to be submitted (e.g. by causing the submission of the HTTP POST request that is invoked when the submit button is clicked) to the website to cause the user to be automatically logged in to the website.

LastPass maintains a cloud based repository where each user's login credentials are stored and can be accessed from any computer. However, without installing the browser plug-in on a local computer, the automatic population of credentials and the automatic submission of login requests cannot be performed on the local computer.

Password managers like LastPass are effective when a user is using the same computer or computers where the plug-in has been installed. However, if the user is ever using a different computer on which the plug-in is not installed, the user cannot employ the password managers to automatically populate credentials or automatically log in. These password managers will allow the user to access the cloud based repository to view the credentials, but the user will have to enter the credentials and log in manually as when no password manager is used. Therefore, even though many of these password managers claim to provide access to login credentials from anywhere or any device, they do not provide the key benefit of automatic login from any device on which the plug-in has not been installed.

Accordingly, it would be an improvement in the art to augment or even replace current techniques with other techniques.

BRIEF SUMMARY

The present invention extends to methods, systems, and computer program products for providing a cloud based password manager that automatically logs in users from any computer. The cloud based password manager does not require that the user install a local plug-in or other tool to perform automatic login. In this sense, unlike current password managers, the password manager of the present invention is completely cloud based.

In one embodiment, the present invention provides a method for automatically logging a user in to a website. A request is received from a first client computing device. The request requests that the server computing system log a user of the first client computing device in to a first website and return an instance of the first website to which the user is logged in. Credentials of the user for logging in to the first website are accessed. Logic is also accessed. The logic defines interactions to be performed with a server computing system that hosts the first website to log the user in to the first website. The logic is executed to perform the interactions using the credentials. An instance of the first website is then received with the user being logged in to the instance of the first website. Finally, the instance of the first website is sent to the first client computing device to enable the user to interact with the instance of the first website without having to log in to the first website.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
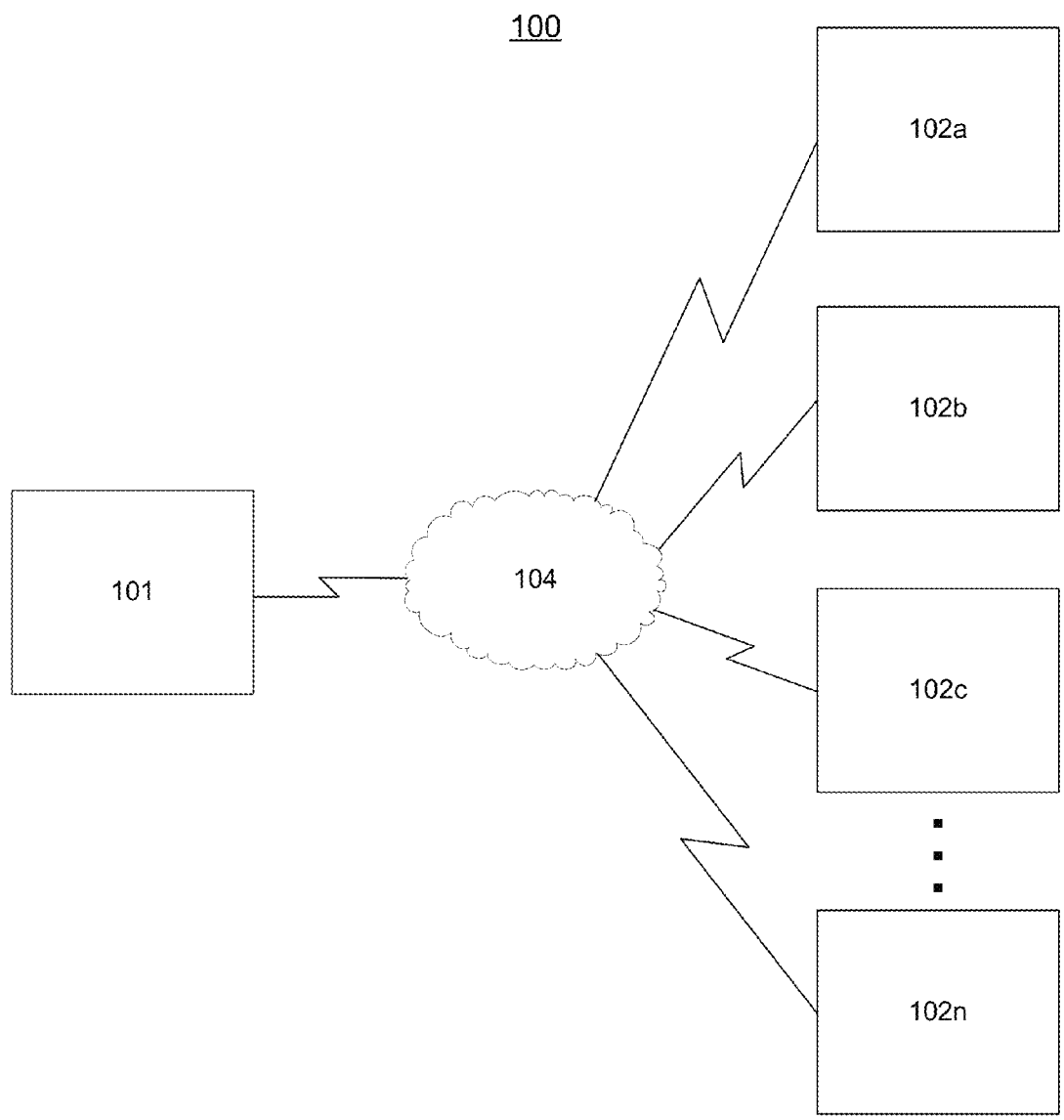
FIG. 1 illustrates a representative computer environment in which the present invention can be implemented.

The present invention extends to methods, systems, and computer program products for providing a cloud based password manager that automatically logs in users from any computer. The cloud based password manager does not require that the user install a local plug-in or other tool to perform automatic login. In this sense, unlike current password managers, the password manager of the present invention is completely cloud based.

In one embodiment, the present invention provides a method for automatically logging a user in to a website. A request is received from a first client computing device. The request requests that the server computing system log a user of the first client computing device in to a first website and return an instance of the first website to which the user is logged in. Credentials of the user for logging in to the first website are accessed. Logic is also accessed. The logic defines interactions to be performed with a server computing system that hosts the first website to log the user in to the first website. The logic is executed to perform the interactions using the credentials. An instance of the first website is then received with the user being logged in to the instance of the first website. Finally, the instance of the first website is sent to the first client computing device to enable the user to interact with the instance of the first website without having to log in to the first website.

Embodiments of the present invention may comprise or utilize special purpose or general-purpose computers including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

FIG. 1 illustrates an representative computer environment 100 in which the present invention can be implemented. Computer environment 100 includes server system 101, and client computing devices 102a-102n that are connected to server system 101 over network 103. Server system 101 can represent any number of interconnected computing components. For example, server system 101 can represent a single server computing device or a cloud of interconnected server computing devices or components. Client computing devices 102a-102n represent any type of device that can access server system 101 over network 103. For example, any of client computing devices 102a-102n can be a smart phone, tablet, laptop, desktop, or any other type of computing device that accesses server system 101 over the internet.

Figure 2:
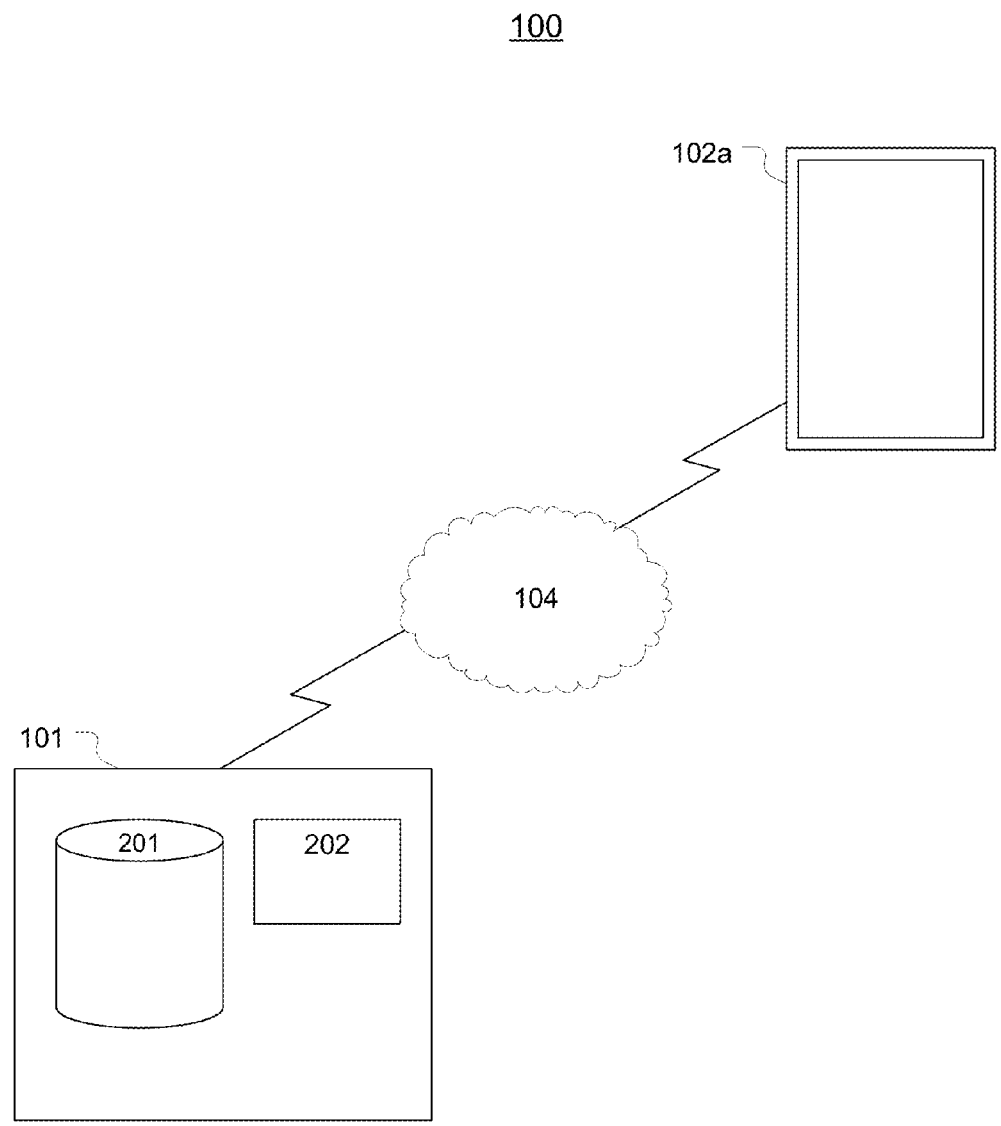
FIG. 2 illustrates a server system and a client computing device of the computer environment of FIG. 1.

FIG. 2 illustrates a more detailed view of server system 101 and client computing device 102a which is represented as a tablet. As shown, server system 101 maintains a repository 201 for storing the various users' login credentials. Server system 101 also comprises login request processing logic 202. Logic 202 is configured to receive requests from client computing devices 102a-102n to log in to one or more websites, access the login credentials in repository 201, and perform the required interaction with the requested website to log the user in to the website.

Figure 3:
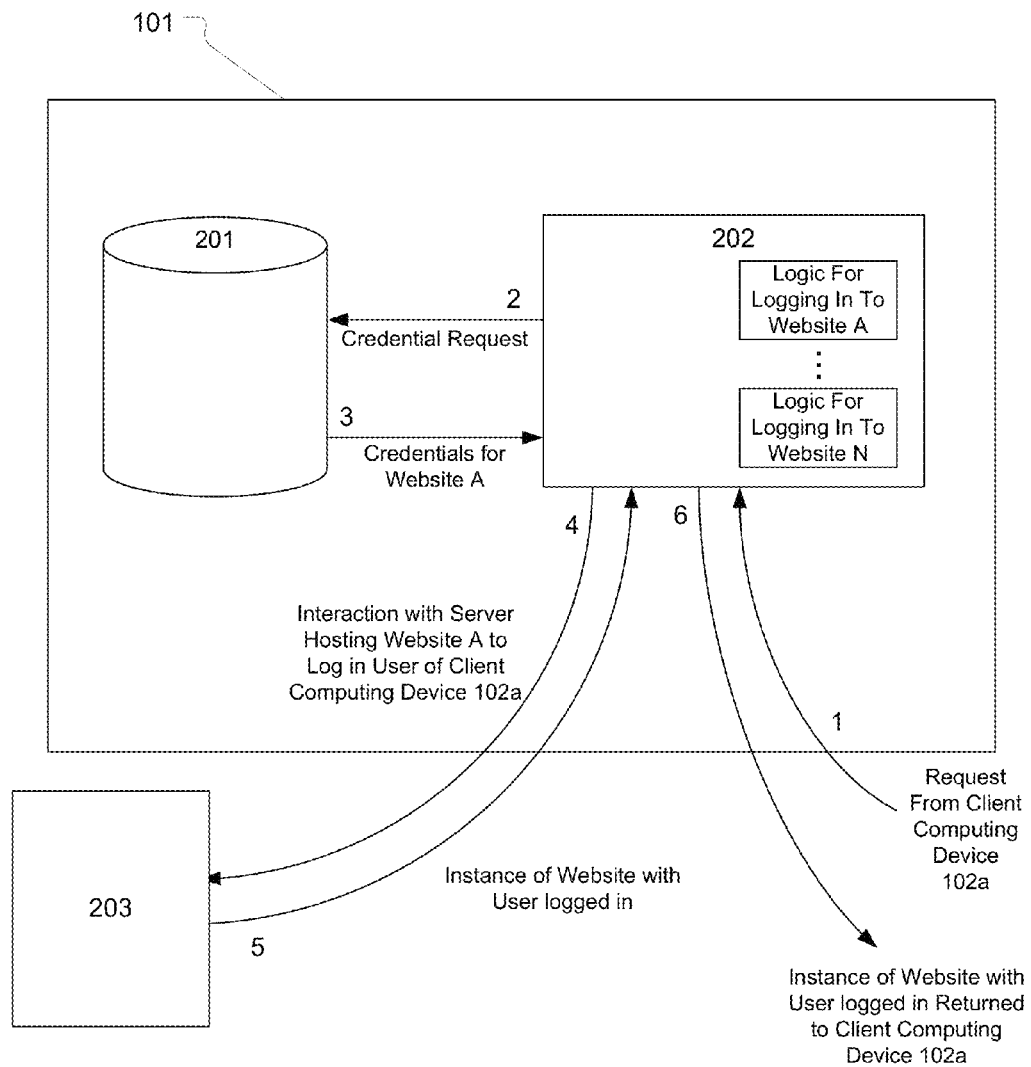
FIG. 3 illustrates a flow diagram of the process performed by logic stored on a server system when a request to log in to a website is received.

FIG. 3 illustrates a flow diagram 300 which represents the process performed by logic 202 when a request to log in to a website A is received from a user of computing device 102a. Flow diagram 300 shows six general steps of this process.

First, a request is received from client computing device 102a to access website A. This request can be sent to server 101 in response to a user inputting a URL or selecting a representation (e.g. an icon, a link, etc) of website A from a webpage, app, or other interface being displayed on client computing device 102a.

Second, in response to the request, logic 202 identifies website A in the request and requests or otherwise accesses the user's credentials for website A from repository 201. Third, the credentials for website A are received from repository 201.

Fourth, logic 202 includes logic for logging in to website A which is used to interact with a server hosting website A to log the user into website A. Because each website may require different steps for logging in, logic 202 can include necessary logic to perform the required steps for logging in to any of the websites for which server 101 maintains login credentials. In some embodiments, logic 202 comprises an API based routine configured to log in to a specific website.

For example, the steps for logging in to a banking website may be different than the steps for logging in to an email account. These steps can include a single request that includes the user's credentials, or multiple tiered requests that each may require a different credential or combination of credentials to log the user in. Accordingly, for each website that a user may attempt to log in to, logic 202 can include necessary logic for interacting with the appropriate server to perform the steps to log the user in.

In a particular example, logic 202 can be configured to know the format and content of an HTTP Post request that a particular website expects to receive in a login request. In such cases, logic 202 can include or have access to a generic HTTP Post request for website A (e.g. in any necessary format such as SOAP, JSON, HTML, etc.). Logic 202 can customize the request with a user's username and password content so that, when server 101 submits the customized HTTP Post request, server 101 receives back a version of website A with the user logged in. Of course, other types of requests and/or content can be used as required by a particular website.

Fifth, once the necessary interactions have occurred between server 101 and the server hosting website A to log the user in, an instance of the website with the user logged in is returned to server 101. This instance of the website can be the same as if the user had manually logged in to the website directly from client computing device 102*a*.

Sixth, this instance of the website with the user logged in is returned to client computing device 102*a* where the user can interact with the website as if he had manually logged in on client computing device 102*a*. In this manner, each of the steps required to log the user in to a website is performed on server system 101 thereby eliminating the need for any download, plug-in, or other locally executing logic to perform automatic login on client computing device 102*a*.

As such, by implementing the present invention, the user of client computing device 102*a* could use any other client computing device in the manner described above to be automatically logged in to a website. In contrast, current password managers require a local plug-in, software, or other module which performs the interactions with the website to log the user in. In other words, using other password managers, an instance of the website without the user logged in is returned to the client computing device. Then, the plug-in on the client computing device populates the log in fields and submits the credentials to receive a logged in instance of the website. Therefore, using these current password managers, if the user switched to another client computing device, the user would have to first install a plug-in or other module on the other client computing device before being able to be automatically logged in to a website.

Figure 4A:
FIGS. 4A-11B illustrate various representative user interfaces that can be displayed to a user to facilitate the use of the present invention.

FIG. 4A illustrates an representative user interface 400 that server system 101 can provide to client computing device to allow a user to make requests to access a website. User interface 400 can be in the form of a webpage, an app, or other user interface. User interface 400 includes a plurality of tiles. Each of the tiles represents a website for which server system 101 stores login credentials for the user. Other display formats could be used instead of tiles such as different sized icons, lists, etc. In some embodiments, user interface 400 can provide an option to customize the display of the representations of the websites.

By selecting one of the tiles, a request can be sent to server system 101 to receive an instance of the associated website with the user logged in. After a tile is selected on a client computing device, the client computing device receives an instance of the website with the user logged in without requiring the client computing device to perform any action other than to submit the request for the website, receive the instance of the website, and display it.

Figure 4B:
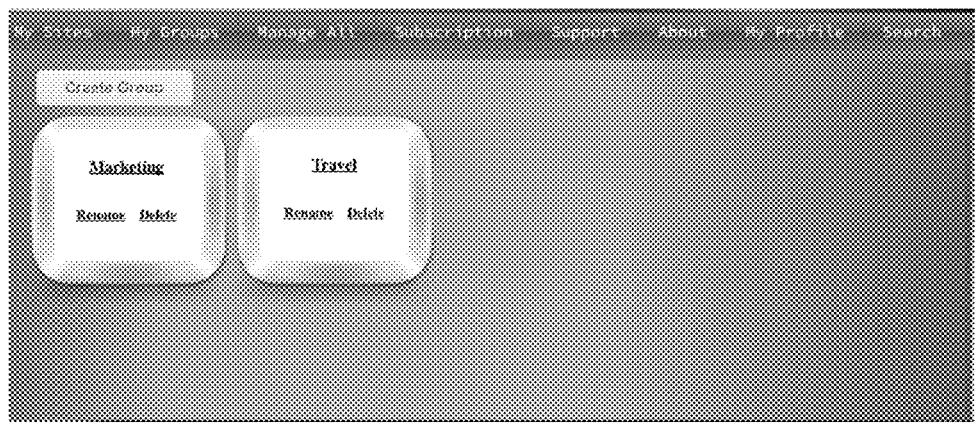
Figure 4C:

FIG. 4B illustrates representative user interface 400 with an option to request a group of websites. For example, user interface 400 can allow a user to group together two or more websites and then make a single request to open all websites in the group. As shown in FIG. 4B, a group has been created for Marketing and Travel. FIG. 4C shows user interface 400 after the Travel group has been opened. The Travel group includes three websites, and therefore, three tiles are displayed. When the Travel group is selected, all three websites are automatically opened with the user logged in.

It is also possible to include one or more websites in a group that do not require login credentials. For example, a user may include a banking website, an investing website, and a stock market website in a group even when the stock market website does not require login credentials. When the group is selected, the banking and investing website can be requested as described above to receive an instance of each website with the user logged in. Server 101 can also request a generic instance of the stock market website and return it with the instances of the banking and investing websites.

In some embodiments, whether a generic or logged in instance of a website is returned to a client computing device can be configured by the user. For example, the user may specify that he desires to include a website in user interface 400 that requires login credentials, but does not desire to supply the login credentials. This may be the case, for example, when the user desires to access a banking website with which the user has an account, but does not desire to be logged in to the website each time he accesses the website. In such cases, logic can be stored on server system 101 or included in a request sent to server system 101 that specifies whether to log the user in to a website in response to a request for the website.

In some embodiments, server system 101 can log users in at different levels. In other words, certain websites may require multiple tiers of authentication. For example, many banking websites require the user to enter a username and password in a first screen, and then enter additional credentials in a second screen to log in. In such cases, server system 101 can perform the first step of logging the user in through the first tier (e.g. submit the user name and password), but can then return an instance of the website having the user logged in to the second tier (e.g. returning the screen that prompts the user to enter the additional criteria). The individual logic on server system 101 for logging in to a website can be configured appropriately to perform a desired level of authentication on behalf of the user.

Figure 5:
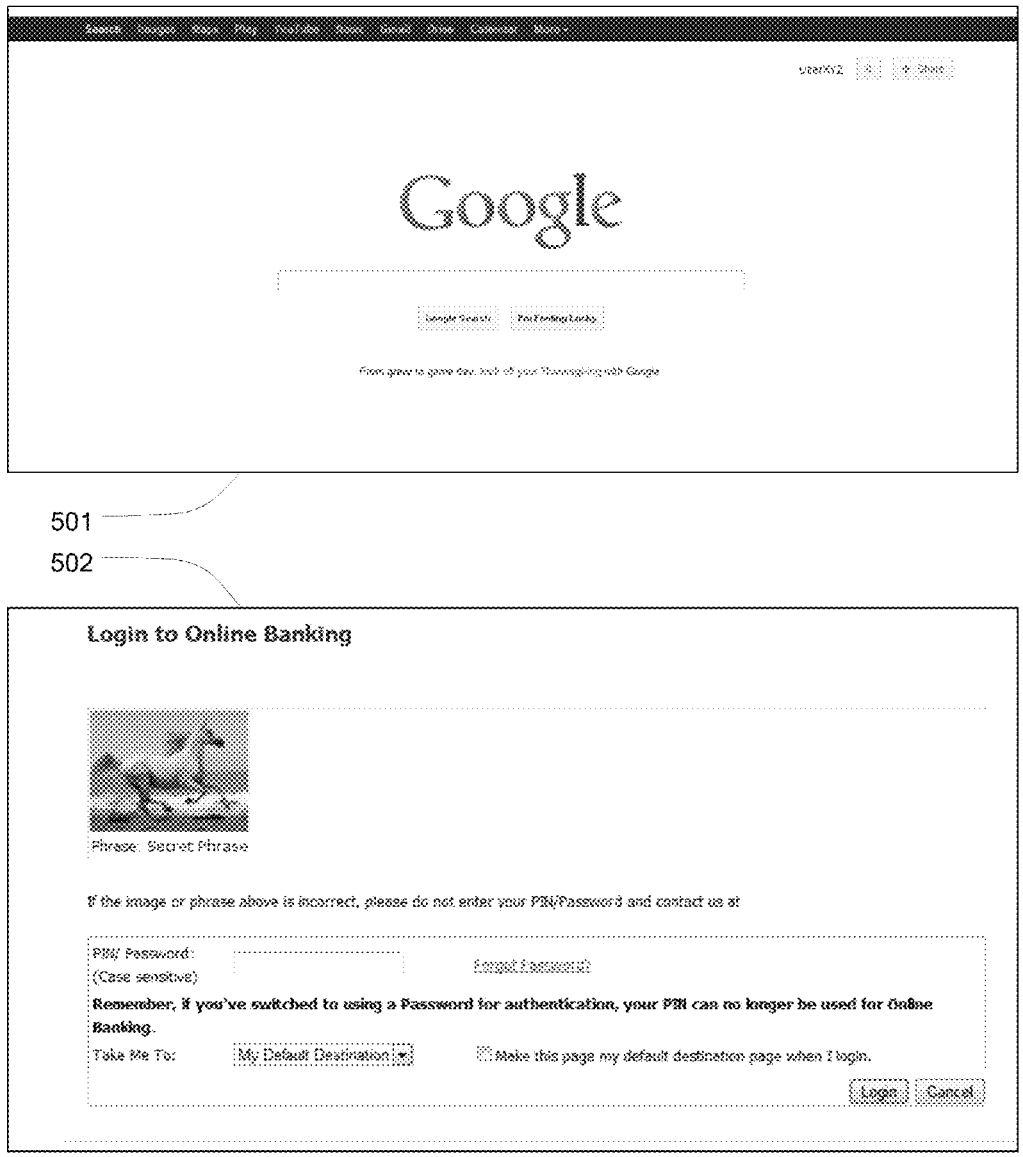

FIG. 5 illustrates two representative instances of websites that server system 101 can return to a client computing device. Instance 501 represents the case where the user is fully logged in to the website by server system 101. As such, instance 501 shows that the user is logged in as UserXYZ.

Instance 502 represents the case where the user has been logged in to a website through a first tier of a two tier authentication scheme. Instance 502 shows that the user is not fully logged in, but requires that the user manually enter additional credentials to complete logging in.

Figure 6:
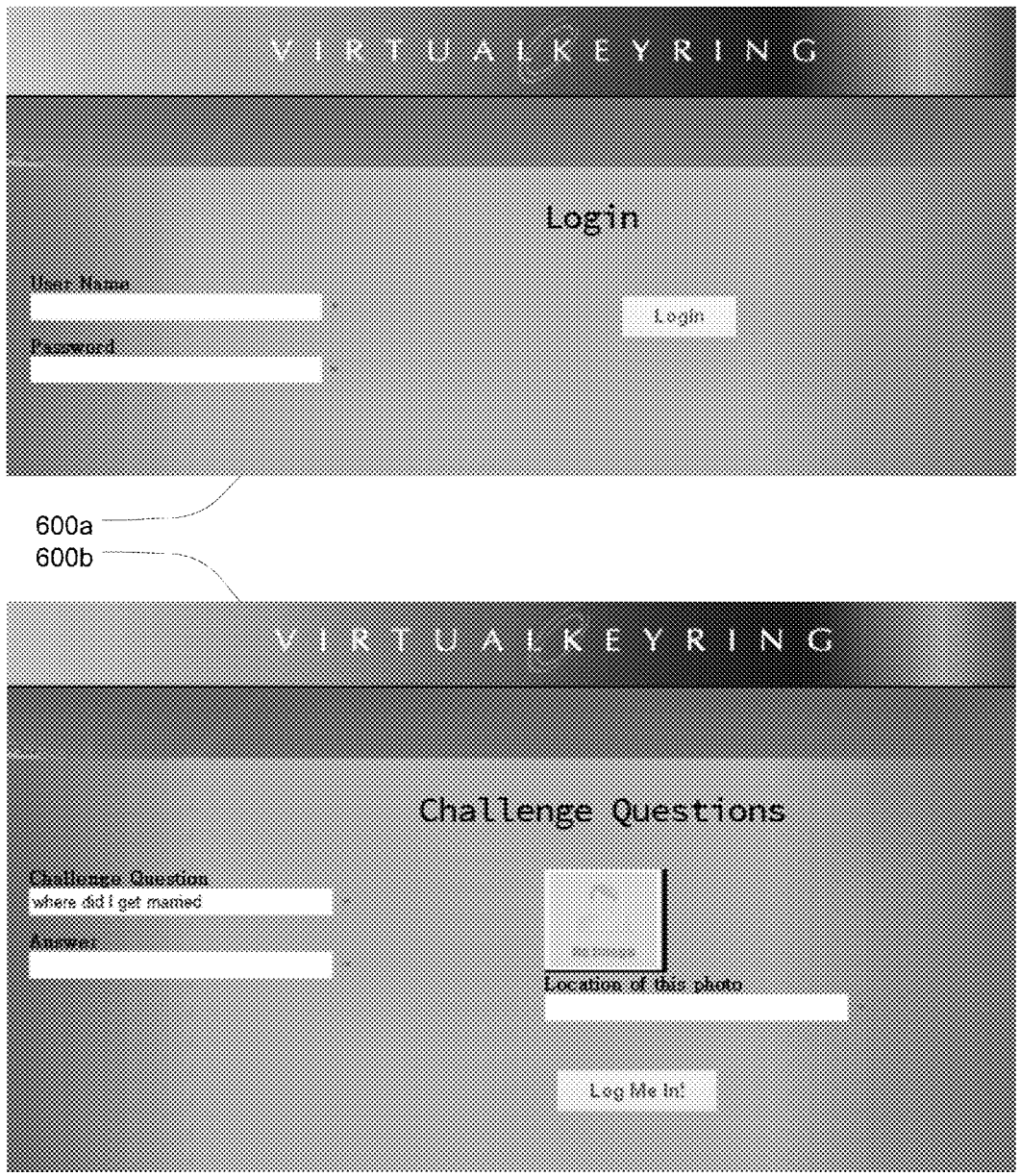

FIG. 6 illustrates a representative user interface 600 that server system 101 can provide to allow a user to log in to the service provided by server system 101. Because server system 101 stores the user's sensitive log in credentials, server system 101 can require multiple tier authentication before the user can make requests to access websites. In some embodiments, this multiple tier authentication can comprise a three tiered approach which requires a username and password, an answer to a challenge question, and the identification of a location where a photo was taken.

As shown in FIG. 6, initially user interface 600*a* prompts the user to input a username and password combination. Then, user interface 600*b* displays a challenge question and a photo with a prompt to answer the challenge question and to identify the location where the photo was taken. In this way, the multiple tier authentication requires a user to know many different types of information thus making it difficult to unlawfully gain access to another user's account.

Figure 7:
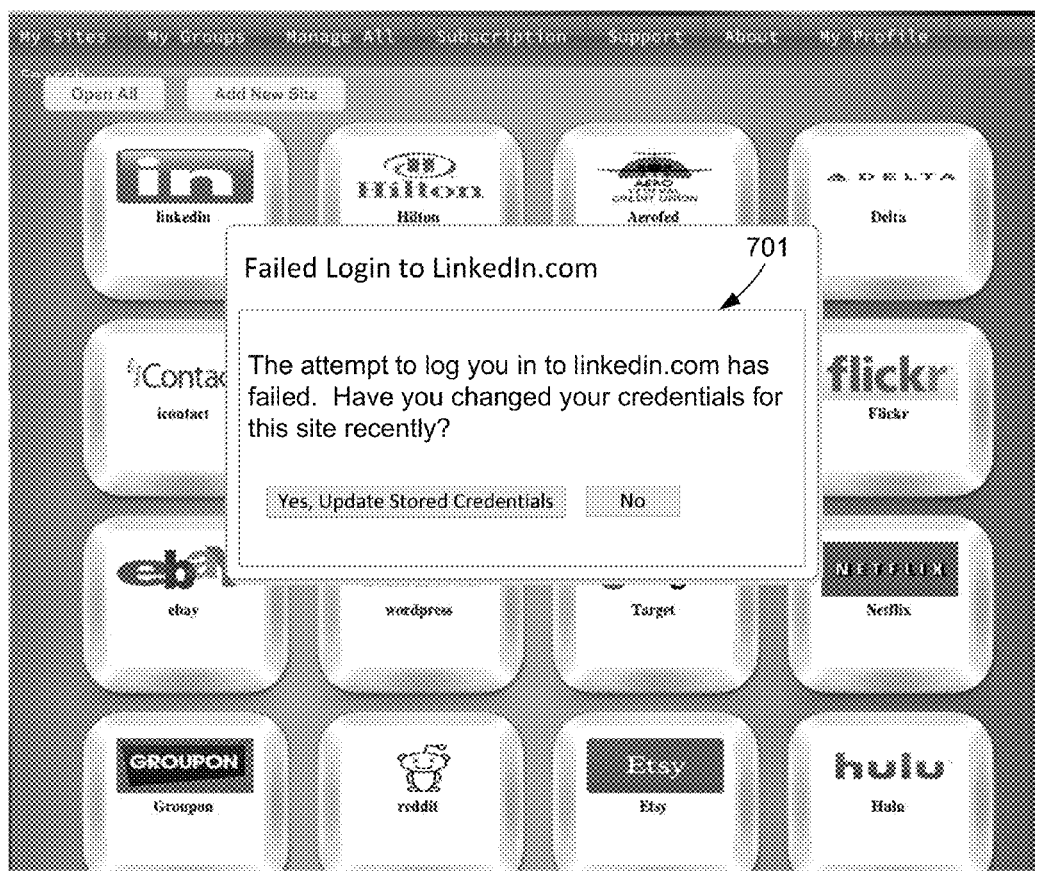

FIG. 7 illustrates a representative user interface 700 provided by server system 101 to inform the user that credentials stored for a website are no longer valid. As shown, user interface 700 includes a dialog 701 which notifies the user that login has failed and asks the user whether the user recently changed the credentials (e.g. password) for the website. In some embodiments, dialog 701 can also include a link to an interface for updating the stored credentials. In this way, the user can quickly access the necessary interface to update any stored credentials that the user has updated with the corresponding website.

Figure 8A:

FIG. 8A illustrates a representative user interface 800 provided by server system 101 to allow the user to add credentials for a new website. User interface 800 includes fields for specifying the URL of the website and the credentials for the website. In some embodiments, when the user submits a request to add a new website, server system 101 can determine whether it stores logic for automatically logging a user in to the website. Specifically, because server system 101 is configured with logic for performing all the necessary steps to obtain an instance of a website with the user logged in, and because each website may require different steps, it is necessary that server system 101 contain the appropriate logic for each website.

Figure 8B:
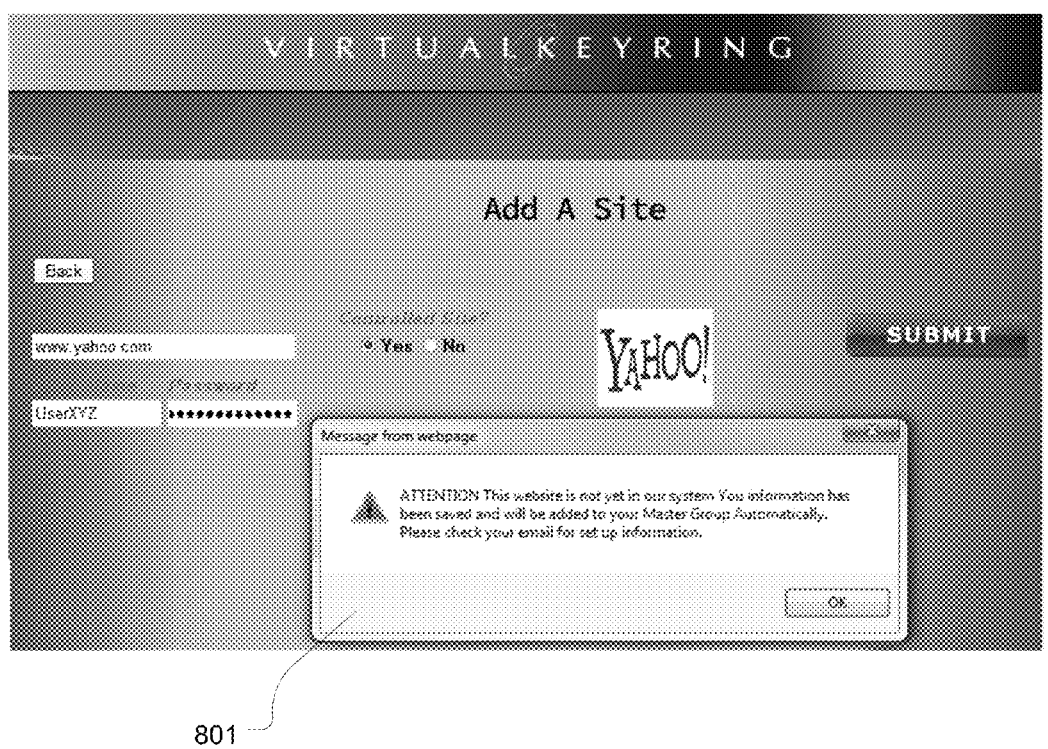

As shown in FIG. 8B, if a user requests to add a new website for which server system 101 has not yet been configured to obtain logged in instances, a dialog 801 can be displayed to the user to inform the user that the user cannot currently be logged in to the website, but that the user will be notified when server system 101 is configured to perform automatic login to the website. As shown in dialog 801, this notification can be in the form of an email to the user once server system 101 has been updated with the necessary logic. Other forms of notification could also be used.

Figure 9:

FIG. 9 illustrates a representative user interface 900 provided by server system 101 that includes a button 901 that allows the user to import credentials maintained in a separate file. For example, a user may maintain credentials in a spreadsheet, word processing, or other type of document. User interface 900 provides a way for the user to submit such files to server system 101 to allow server system 101 to automatically import the credentials in the files into repository 201. When button 901 clicked, user interface 900 can displays instructions for assisting the user in formatting the file appropriately to match mappings used by server system 101, or may provide controls for allowing the user to define custom mappings to the format of the file. For example, user interface 900 can include controls to allow the user to define which columns or rows of a spreadsheet include usernames or passwords.

Regardless of the method the user employs to add a new website, the password manager of the present invention, as described above, ties the user's credential for the website into a sign-in program that, when the user requests the website, automatically requests a copy of the website with the user logged in and returns the logged in copy of the website to the user. In this way, the user's credentials are stored in the cloud, and the login process occurs completely in the cloud so that the no dedicated software, plug-in, or app is required on the user's device. The user simply selects a website from any computing device and receives a logged in copy of the website.

In some embodiments, the above described user interfaces can be portions of a website provided by another company. For example, a banking institution can provide a portal for its customers that includes user interface 400 to allow the customers to access any of their websites from the banking institution's website.

Figure 10:

FIG. 10 illustrates a representative portal website 1000 of a banking institution that includes user interface 1001 for making requests to server system 101. User interface 1001 can be similar to user interface 400. Portal website 1000 can include advertisements that are targeted to the customer of the banking institution. In this way, the banking institution can attract customers to visit the portal website more frequently and therefore view the advertisements more frequently.

For example, by including user interface 1001 to its customers, the banking institution can encourage its customers to use the banking institution's website as their primary portal to other websites on the internet. Portal website 1000 can be configured to display advertisements that are custom tailored for each customer such as advertisements promoting a banking product that the banking institution is not currently providing to the customer (e.g. offering a credit card to a customer that only has a checking account with the institution). Accordingly, the present invention can be implemented by embedding an interface for accessing server system 101 within a website of another entity.

Figure 11A:
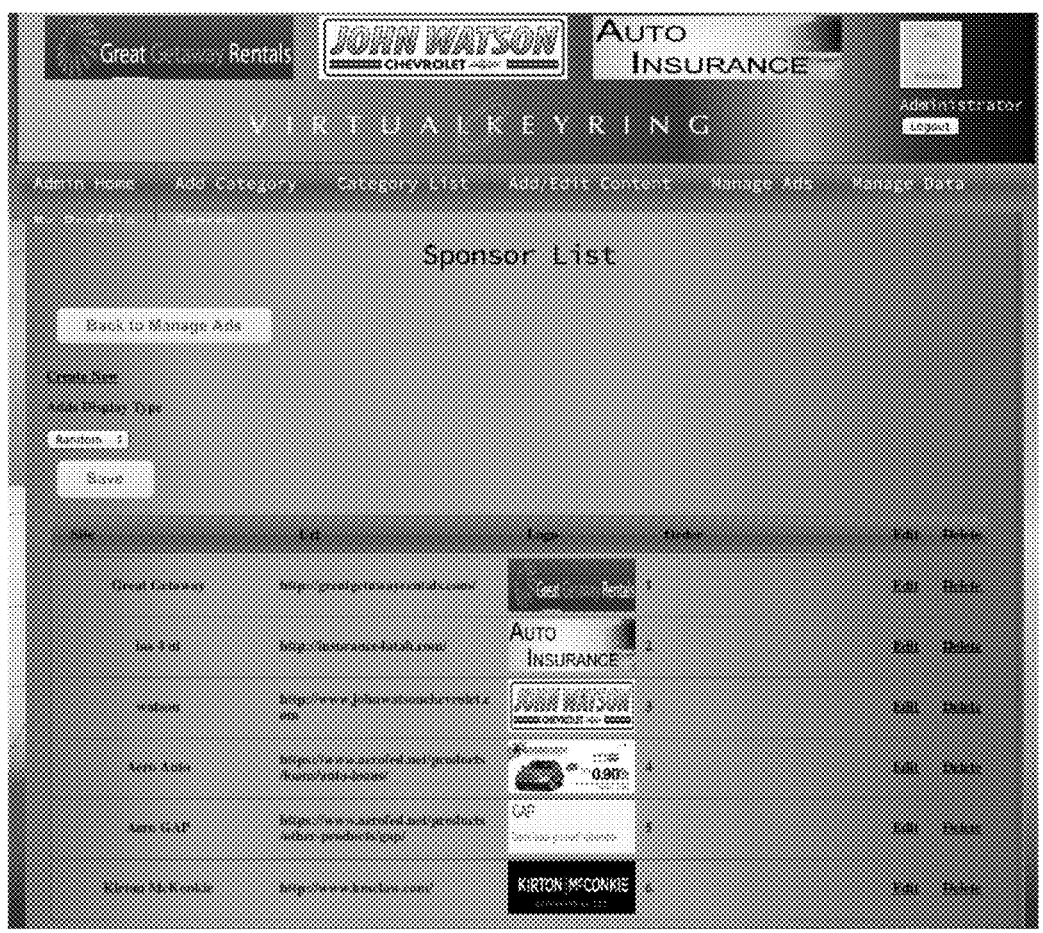
Figure 11B:
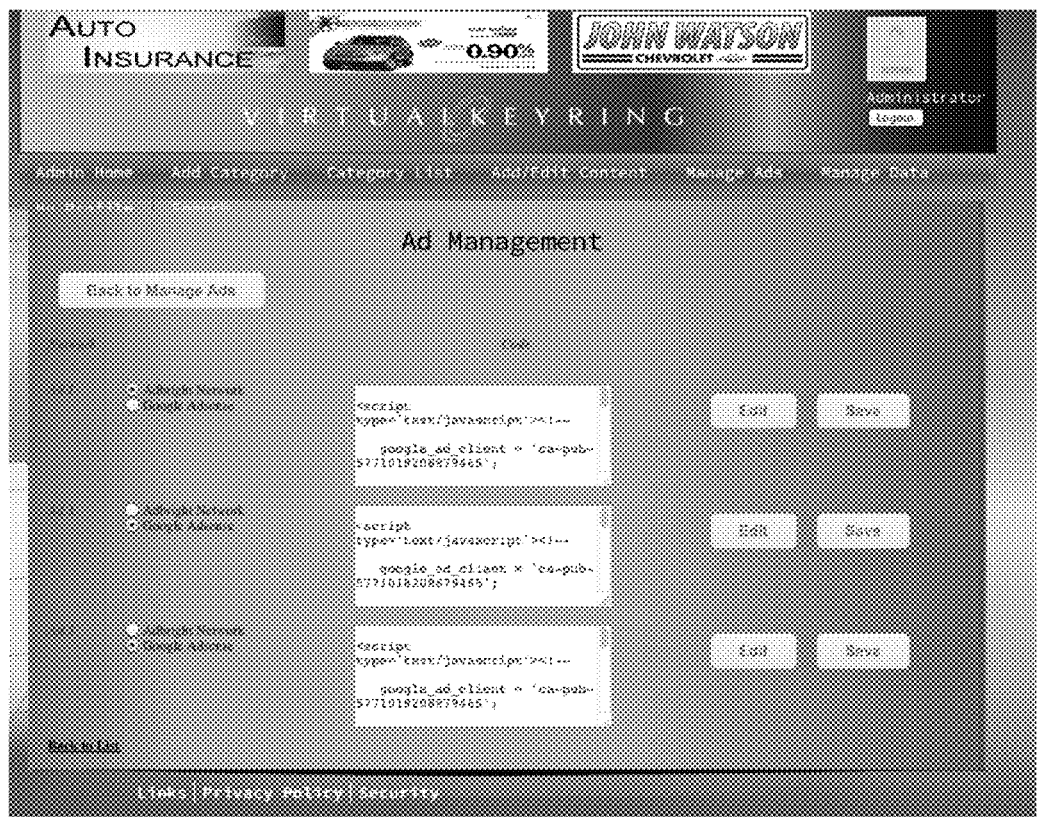

The present invention can provide an interface to allow a bank or other portal owner to customize the display of advertisements on portal website 1000. For example, FIG. 11A illustrates a representative user interface 1100 that lists a plurality of ads that are to be displayed in portal website 1000. FIG. 11B also shows that advertisements from internet ad networks can also be managed via user interface 1100.

In some embodiments, the present invention can also provide a site monitor feature. The site monitor feature monitors websites for which credentials are stored and can detect when the user is logged in to a website on a computer other than the computer the user is currently using to access the password management tool. For example, if a user logged in to Facebook on a computer at the Apple Store, forgot to logout, and then logged into the password management tool using a work computer, the site monitor feature of the present invention can check the login status for any websites monitored for the user, and notify the user accordingly. The site monitor feature can also provide an option to log the user out from his connection on the other computer. This can prevent unauthorized access by another person in such situations.

The site monitor feature can detect whether a user is logged in to a particular website using similar techniques described above for logging the user in to the website. For example, because the way to determine whether a user is logged in to a website on another computer may be different for each website, logic 202 can also include the necessary logic to check the login status of each website.

For example, for some websites, the content of the website returned to server 101 when server 101 attempts to log the user in may be different when the user is logged in elsewhere than when the user is not logged in anywhere else. Logic 202 can be configured to detect any differences in the content to determine that the user is logged in elsewhere, and can also include logic for logging the user out (e.g. logic to identify and invoke a log out button on the website).

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, performed by a server computing system, for automatically logging a user in to a website, the method comprising:

receiving, at the server computing system, a request from a first client computing device, the request requesting that the server computing system log a user of the first client computing device in to a first website and return an instance of the first website to which the user is logged in;

accessing credentials, stored on the server computing system, of the user for logging in to the first website;

accessing logic, stored on the server computing system, which defines interactions to be performed with a server computing system that hosts the first website to log the user in to the first website;

executing the logic to perform the interactions using the credentials;

receiving, by the server computing system, an instance of the first website, the user being logged in to the instance of the first website; and sending, by the server computing system, the instance of the first website to the first client computing device to enable the user to interact with the instance of the first website without having to log in to the first website.

2. The method of claim 1, further comprising:

receiving, at the server computing system, a request from a second client computing device, the request requesting that the server computing system log the user in to the first website and return an instance of the first website to which the user is logged in;

accessing the credentials of the user for logging in to the first website;

accessing the logic which defines interactions to be performed with the server computing system that hosts the first website to log the user in to the first website;

executing the logic to perform the interactions using the credentials;

receiving an instance of the first website, the user being logged in to the instance of the first website;

sending the instance of the first website to the second client computing device to enable the user to interact with the instance of the first website without having to log in to the first website on the second client computing device.

3. The method of claim 1, wherein the interactions defined by the logic comprise a request to the server computing system that hosts the first website, the request including a user name and password of the user.

4. The method of claim 1, wherein the interactions defined by the logic comprise multiple requests to the server computing system that hosts the first website, each of the multiple requests containing a different combination of credentials of the user.

5. The method of claim 1, wherein the instance of the first website to which the user is logged in comprises an instance of the first website to which the user is logged in through a first tier of authentication of a multiple tier authentication required by the server computing system that hosts the first website.

6. The method of claim 1, further comprising:

in response to a subsequent request to return an instance of the first website to a client computing device used by the user, executing the logic to perform the interactions with the server computing system that hosts the first website;

receiving an indication that the attempt to log the user in to the first web site has failed; and notifying the user that the login has failed.

7. The method of claim 6, wherein notifying the user that the login has failed comprises providing a link to the user that when selected allows the user to update the stored credentials for the first website.

8. The method of claim 1, further comprising:

receiving, at the server computing system, a request from a second client computing device, the request requesting that the server computing system log a user of the second client computing device in to a second website and return an instance of the second website to which the user is logged in;

determining that the server computing system does not store logic which defines interactions to be performed with a server computing system that hosts the second website to log a user in to the second website; and sending a notification to the user of the second client computing device, the notification indicating that a request has been created to implement logic, the logic defining interactions to be performed with the server computing system that hosts the second website to log a user in to the second website.

9. The method of claim 1, further comprising:

receiving, at the server computing system, a file from the first client computing device, the file including credentials for a plurality of websites; and automatically importing the credentials for the plurality of websites based on one or more defined rules.

10. The method of claim 9, wherein the one or more defined rules are user defined rules that identify how credentials in the file are formatted.

11. The method of claim 1, further comprising:

detecting that the user is currently logged in to a second website via a different client computing device; and notifying the user that the user is logged in to the second website via the different client computing device.

12. The method of claim 11, further comprising:

receiving, from the first client computing device, a request to log the user out of the second website;

accessing logic, stored on the server computing system, which defines interactions to be performed with a server computing system that hosts the second website to log the user out of the second website; and executing the logic to cause the user to be logged out of the second website.

13. The method of claim 1, wherein executing the logic to perform the interactions using the credentials comprises:

accessing a generic login request for the first website;

customizing the generic login request to include the credentials of the user; and submitting the customized login request to the server computing system that hosts the first website.

14. The method of claim 13, wherein the generic login request comprises an HTTP Post request.

15. A server computing system that is configured to automatically log a user in to a website from any client computing device that can communicate with the server computing system, the server computing system comprising:

one or more processors; and memory storing computer executable instructions which when executed by the one or more processors perform a method comprising:

receiving, at the server computing system, a request from a first client computing device, the request requesting that the server computing system log a user of the first client computing device in to a first website and return an instance of the first website to which the user is logged in;

accessing credentials, stored on the server computing system, of the user for logging in to the first website;

accessing logic, stored on the server computing system, which defines interactions to be performed with a server computing system that hosts the first website to log the user in to the first website;

executing the logic to perform the interactions using the credentials;

receiving, by the server computing system, an instance of the first website, the user being logged in to the instance of the first website; and sending, by the server computing system, the instance of the first website to the first client computing device to enable the user to interact with the instance of the first website without having to log in to the first website.

16. The server computing system of claim 15, the method performed further comprising:

detecting that the user is currently logged in to a second website via a different client computing device; and notifying the user that the user is logged in to the second website via the different client computing device.

17. The server computing system of claim 15, the method performed further comprising:

receiving, from the first client computing device, a request to log the user out of the second website;

accessing logic, stored on the server computing system, which defines interactions to be performed with a server computing system that hosts the second website to log the user out of the second website; and executing the logic to cause the user to be logged out of the second website.

18. The server computing system of claim 15, wherein executing the logic to perform the interactions using the credentials comprises:

accessing a generic login request for the first website;

customizing the generic login request to include the credentials of the user; and submitting the customized login request to the server computing system that hosts the first website.

19. The server computing system of claim 18, wherein the generic login request comprises an HTTP Post request.

20. One or more non-transitory computer readable media storing computer executable instructions which when executed perform a method for automatically logging a user in to a website, the method comprising:

receiving, at a server computing system, a request from a first client computing device, the request requesting that the server computing system log a user of the first client computing device in to a first website and return an instance of the first website to which the user is logged in;

accessing credentials, stored on the server computing system, of the user for logging in to the first website;

accessing logic, stored on the server computing system, which defines interactions to be performed with a server computing system that hosts the first website to log the user in to the first website;

executing the logic to create a login request that includes the credentials;

submitting the login request to the server computing system that hosts the first website;

receiving, by the server computing system, an instance of the first website, the user being logged in to the instance of the first website; and sending, by the server computing system, the instance of the first website to the first client computing device to enable the user to interact with the instance of the first website without having to log in to the first website.

\* \* \* \* \*